US008296577B2

(12) United States Patent
Shu et al.

(10) Patent No.: US 8,296,577 B2
(45) Date of Patent: Oct. 23, 2012

(54) CRYPTOGRAPHIC BUS ARCHITECTURE FOR THE PREVENTION OF DIFFERENTIAL POWER ANALYSIS

(75) Inventors: David B. Shu, West Hills, CA (US); Lap-Wai Chow, South Pasadena, CA (US); William M. Clark, Jr., Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 2245 days.

(21) Appl. No.: 10/864,556

(22) Filed: Jun. 8, 2004

(65) Prior Publication Data

US 2005/0273630 A1   Dec. 8, 2005

(51) Int. Cl.
*H04L 9/00* (2006.01)
(52) U.S. Cl. .......... 713/189; 713/193; 380/46; 380/260; 380/29
(58) Field of Classification Search .................... 713/189
See application file for complete search history.

(56) References Cited

U.S. PATENT DOCUMENTS

| | | | |
|---|---|---|---|
| 4,978,955 A | 12/1990 | Howell | 341/109 |
| 5,357,465 A * | 10/1994 | Challa | 365/185.18 |
| 5,392,441 A * | 2/1995 | Brasher et al. | 710/305 |
| 5,560,000 A | 9/1996 | Vogley | |
| 5,866,933 A | 2/1999 | Baukus et al. | 257/368 |
| 5,944,833 A | 8/1999 | Ugon | 713/400 |
| 6,014,446 A * | 1/2000 | Finkelstein | 380/46 |
| 6,060,908 A | 5/2000 | Heyne et al. | 326/93 |
| 6,076,161 A | 6/2000 | Ho | |
| 6,208,135 B1 | 3/2001 | Shattil | 324/225 |
| 6,294,816 B1 | 9/2001 | Baukus et al. | 257/368 |
| 6,295,606 B1 * | 9/2001 | Messerges et al. | 713/189 |
| 6,298,135 B1 * | 10/2001 | Messerges et al. | 380/1 |
| 6,298,153 B1 | 10/2001 | Oishi | 382/186 |
| 6,299,069 B1 | 10/2001 | Shona | 235/492 |
| 6,317,820 B1 | 11/2001 | Shiell et al. | |
| 6,408,075 B1 | 6/2002 | Ohki et al. | 380/28 |
| 6,613,661 B1 | 9/2003 | Baukus et al. | 438/598 |
| 6,678,707 B1 * | 1/2004 | Butler | 708/250 |
| 6,715,010 B2 * | 3/2004 | Kumata | 710/71 |
| 6,839,847 B1 | 1/2005 | Ohki et al. | 713/194 |
| 7,127,620 B2 * | 10/2006 | Boeckeler | 713/194 |

(Continued)

FOREIGN PATENT DOCUMENTS

DE    199 36 939 A1    4/2000

(Continued)

OTHER PUBLICATIONS

Hohlmann, H.D.L., et al. "Protection of software algorithms executed on secure modules", *Future Generations Computer Systems*, vol. 13, No. 1, pp. 55-63 (Jul. 1997).

(Continued)

*Primary Examiner* — William S. Powers
*Assistant Examiner* — Yonas Bayou
(74) *Attorney, Agent, or Firm* — Ladas & Parry

(57) ABSTRACT

An apparatus and method for preventing information leakage attacks through a polarized cryptographic bus architecture. The polarized cryptographic bus architecture randomly changes the polarity of the target bit such that the leaked information cannot be consistently averaged to yield statistical key material. Further, to increase the prevention of information leakage attacks, a set of dual rails is used to write data to a given register bit.

31 Claims, 8 Drawing Sheets

U.S. PATENT DOCUMENTS

| | | | |
|---|---|---|---|
| 7,194,633 B2 * | 3/2007 | Kaiserswerth et al. | 713/189 |
| 7,284,133 B2 * | 10/2007 | Watanabe et al. | 713/189 |
| 7,319,758 B2 * | 1/2008 | Pomet et al. | 380/260 |
| 2001/0025344 A1 * | 9/2001 | Teglia | 713/200 |
| 2001/0053220 A1 * | 12/2001 | Kocher et al. | 380/29 |
| 2002/0084333 A1 * | 7/2002 | Nakano | 235/492 |
| 2002/0131596 A1 | 9/2002 | Boeckeler | 380/252 |
| 2002/0169968 A1 * | 11/2002 | Gammel et al. | 713/189 |
| 2003/0005321 A1 * | 1/2003 | Fujioka | 713/193 |
| 2003/0044003 A1 | 3/2003 | Chari | 380/28 |
| 2003/0091191 A1 * | 5/2003 | Watanabe et al. | 380/277 |
| 2003/0093684 A1 * | 5/2003 | Kaiserswerth et al. | 713/193 |
| 2003/0110390 A1 * | 6/2003 | May | 713/194 |
| 2003/0118190 A1 | 6/2003 | Sedlak et al. | 380/277 |
| 2004/0039928 A1 * | 2/2004 | Elbe et al. | 713/189 |
| 2004/0088488 A1 | 5/2004 | Ober et al. | |
| 2004/0133794 A1 * | 7/2004 | Kocher et al. | 713/193 |
| 2004/0143747 A1 * | 7/2004 | Eckstein et al. | 713/189 |
| 2005/0169462 A1 * | 8/2005 | Jung et al. | 380/28 |
| 2005/0193045 A1 | 9/2005 | Yamamoto et al. | 708/250 |
| 2005/0232430 A1 * | 10/2005 | Gebotys | 380/286 |
| 2005/0273630 A1 | 12/2005 | Shu et al. | 713/189 |
| 2006/0282678 A1 | 12/2006 | Ali et al. | 713/185 |

FOREIGN PATENT DOCUMENTS

| | | | |
|---|---|---|---|
| DE | 19845073 | | 4/2000 |
| EP | 1 006 492 | A1 | 6/2000 |
| EP | 1 098 469 | | 5/2001 |
| EP | 11191149 | A | 4/2011 |
| FR | 2 862 150 | | 5/2005 |
| JP | 11-191149 | | 7/1999 |
| WO | 01/90854 | | 11/2001 |
| WO | 2004/053662 | A2 | 6/2004 |

OTHER PUBLICATIONS

U.S. Appl. No. 10/864,568, filed Jun. 8, 2004, Shu et al.
U.S. Appl. No. 10/864,569, filed Jun. 8, 2004, Shu et al.
"American National Standard Data Encryption Algorithm," *American National Standards Insitute, Inc.*, ANSI X3.92-1981, pp. 9-16 (1981).
Kocher, P., et al., "Differential Power Analysis," *Cryptography Research of San Francisco*, California, pp. 1-10 (1998).
Kocher P., et al., "Introduction to Differential Power Analysis and Related Attacks," *Cryptography Research, Inc.*, Internet: <http://www.cryptography.com/resources/whitepapers/DPA-technical.html> pp. 1-5 (1998).
Messerges, T.S., "Investigations of Power Analysis Attacks on Smartcards," *Proceedings of USENIX Workshop on Smartcard Technology*, pp. 151-161 (May 1999).
Aigner, M., et al., "Power Analysis Tutorial," Institute for Applied Information Processing and Communication, University of Technology, Graz, Austria, pp. 1-15, 2008.
U.S. Appl. No. 13/296,740, filed Nov. 15, 2011, Shu.
U.S. Appl. No. 11/628,920, filed Dec. 6, 2006, Shu.
International Search Report for PCT/US2005/020093 dated Jan. 24, 2006.

* cited by examiner

Fig. 4(a)  Simplified illustration of selection function $D(c_i, K_s)$ computing $R_2[b]$ based on ciphertexts $C_i$ and a correct secret key $K_s$ 8 ciphertexts         8 observable (waveforms)

$c_1$ → $D(c_1, K_s) \Rightarrow R_2[b]=1$ → $c_1 \Leftrightarrow w_1$ $c_2$ → $D(c_2, K_s) \Rightarrow R_2[b]=1$ → $c_2 \Leftrightarrow w_2$ $c_3$ → $D(c_3, K_s) \Rightarrow R_2[b]=0$ → $c_3 \Leftrightarrow w_3$ $c_4$ → $D(c_4, K_s) \Rightarrow R_2[b]=1$ → $c_4 \Leftrightarrow w_4$ $c_5$ → $D(c_5, K_s) \Rightarrow R_2[b]=0$ → $c_5 \Leftrightarrow w_5$ $c_6$ → $D(c_6, K_s) \Rightarrow R_2[b]=0$ → $c_6 \Leftrightarrow w_6$ $c_7$ → $D(c_7, K_s) \Rightarrow R_2[b]=0$ → $c_7 \Leftrightarrow w_7$ $c_8$ → $D(c_8, K_s) \Rightarrow R_2[b]=1$ → $c_8 \Leftrightarrow w_8$ Set of 1: $S_1 \Leftrightarrow W_1$ $S_1 = \{c_1\ c_2\ c_4\ c_8\}$;
$D(S_1, K_s) \Rightarrow R_2[b]=1$;
$W_1 = \{w_1\ w_2\ w_4\ w_8\}$;

Set of 0: $S_0 \Leftrightarrow W_0$ $S_0 = \{c_3\ c_5\ c_6\ c_7\}$;
$D(S_0, K_s) \Rightarrow R_2[b]=0$;
$W_0 = \{w_3\ w_5\ w_6\ w_7\}$;

$w\_S1\_avg = \sum_{c_i \in S1} w_i = 1$

Waveform average for $S_1$ $w\_S0\_avg = \sum_{c_i \in S0} w_i = 0$

Waveform average for $S_0$

Fig. 4(b) Simplified illustration of selection function $D(c_i, K_s')$ computing $R_2[b]$ based on ciphertexts $C_i$ and incorrectly guessed key $K_s'$ 8 ciphertexts          8 observable (waveforms)

$c_1 \rightarrow$     $D(c_1, K_s') \Rightarrow R_2[b]=1$      $\longrightarrow$   $c_1 \Leftrightarrow w_1$ $c_2 \rightarrow$     $D(c_2, K_s') \Rightarrow R_2[b]=0$      $\longrightarrow$   $c_2 \Leftrightarrow w_2$ $c_3 \rightarrow$     $D(c_3, K_s') \Rightarrow R_2[b]=0$      $\longrightarrow$   $c_3 \Leftrightarrow w_3$ $c_4 \rightarrow$     $D(c_4, K_s') \Rightarrow R_2[b]=1$      $\longrightarrow$   $c_4 \Leftrightarrow w_4$ $c_5 \rightarrow$     $D(c_5, K_s') \Rightarrow R_2[b]=0$      $\longrightarrow$   $c_5 \Leftrightarrow w_5$ $c_6 \rightarrow$     $D(c_6, K_s') \Rightarrow R_2[b]=1$      $\longrightarrow$   $c_6 \Leftrightarrow w_6$ $c_7 \rightarrow$     $D(c_7, K_s') \Rightarrow R_2[b]=1$      $\longrightarrow$   $c_7 \Leftrightarrow w_7$ $c_8 \rightarrow$     $D(c_8, K_s') \Rightarrow R_2[b]=0$      $\longrightarrow$   $c_8 \Leftrightarrow w_8$ Set of 1: $S_1' \Leftrightarrow W_1'$          Set of 0: $S_0' \Leftrightarrow W_0'$ $S_1' = \{c_1\ c_4\ c_6\ c_7\}$;
$D(S_1', K_s') \Rightarrow R_2[b]=1$;
$W_1' = \{w_1\ w_4\ w_6\ w_7\}$;

$S_0' = \{c_2\ c_3\ c_5\ c_8\}$;
$D(S_0', K_s') \Rightarrow R_2[b]=0$;
$W_0' = \{w_2\ w_3\ w_5\ w_8\}$;

$$w\_S1'\_avg = \sum_{c_i \in S1'} w_i = 0.5$$

$$w\_S0'\_avg = \sum_{c_i \in S0'} w_i = 0.5$$

Waveform average for $S_1'$
(Half of $S_1'$ will come from $S_1$, half from $S_0$)

Waveform average for $S_0'$
(Half of $S_0'$ will come from the rest of $S_1$, half from the rest of $S_0$)

CRYPTOGRAPHIC BUS ARCHITECTURE FOR THE PREVENTION OF DIFFERENTIAL POWER ANALYSIS

CROSS REFERENCE TO RELATED APPLICATIONS

This application is related to U.S. patent application Ser. Nos. 10/864,569 and 10/864,568 filed on the same date as this application and entitled "Cryptographic Architecture with Random Instruction Masking to Thwart Differential Power Analysis" and "Cryptographic CPU Architecture with Random Instruction Masking to Thwart Differential Power Analysis", the disclosures of which are hereby incorporated by reference.

BACKGROUND OF THE INVENTION

1. Field of the Invention

The present invention relates Cryptographic Bus Architectures (CBA). More specifically, the present invention relates to a CBA that prevents an attacker from being able to correlate side channel information.

2. Description of Related Art

Modern cryptography uses the same basic ideas as traditional cryptography, transposition and substitution. Messages to be encrypted, known as plaintext, are transformed by a function that is parameterized by a key. The output of the encryption process, known as the ciphertext, is then transmitted. The received ciphertext is then decrypted, using a related function and key combination, back into plaintext.

One example where modern cryptography is used is in pay-TV conditional-access systems such as pay channels for cable and satellite television. Smart cards and/or security processors (containing secret keys) are used to decrypt the television signals. Attackers buy a cable or satellite receiver and then attack the smart card or security processor inside in order to determine the secret keys. Thus, it is generally assumed that the input and output information, i.e. the plaintext and ciphertext, is available to attackers, and information about the secret keys is unavailable. The cipher text is the information sent from the cable or satellite provider, and the plaintext is the decrypted television signal set to the television. An attacker, as depicted in FIG. 1, may attack the smart card or security processor by looking for information related to the secret keys that may be leaked via EM radiation, power consumption, timing etc. The leaked information, commonly referred to as side channel information, can then be used by attackers in order to determine the secret key used. One common technique for determining a secret key from leaked or side channel information is known as Differential Power Analysis (DPA). Unfortunately, there is no way to guarantee that power consumption, EM radiation, etc. will not leak certain cryptographic process information being performed by a device and thus obtain information about the secret keys. Therefore, what are needed are defensive techniques that result in leaked information that is un-usable by hackers using correlation techniques such as DPA.

The following discussion is background information regarding using DPA to determine the secret key in a smartcard. One skilled in the art will appreciate that this discussion is for illustrative purposes only, and that the present invention may be utilized to protect secret keys of a number of data encryption formats and from a number of hacking techniques in which side channel information is used in order to determine the secret keys.

First, in order to better understand how hacking techniques work, knowledge of common encryption/decryption systems is useful. A common type of cryptosystem uses a block cipher for encrypt and decrypt operations. A block cipher operates on a fixed number of input bits and encrypts or decrypts these bits into a fixed number of output bits. The encrypt and decrypt functions are often constructed using a simple function called a round function. The security of the cryptographic algorithm is achieved by repeatedly applying the round function a fixed number of times. Such a cipher is referred to as an iterative-block cipher. The number of times a block is addressed by a round function is determined, in part, by the secret key.

The Data Encryption Standard (DES) defines a commonly known iterative-block cipher. DES is described in detail in ANSI X.392, "American National Standard for Data Encryption Algorithm (DEA)," American Standards Institute, 1981, which is incorporated by reference herein. One of the major components of the round function of DES is the so-called substitution box or S-box functions. The S-box functions are non-linear and are conventionally implemented using table lookups or Boolean logic gates. The secret key controls access to the S-box function.

A common implementation of the iterative-block ciphers uses the secret key each time a round function is calculated. When this secret key is accessed by a cryptographic device, information about this secret key is apt to be leaked outside the device and can be monitored by an attacker who is able to get close enough to the device to monitor it. In the case of smart cards, if the attacker has possession of the smart card, the attacker is close to the cryptographic device therein to use techniques such as DPA against the device. The information that is leaked is often very subtle and difficult to interpret. However, because this information is correlated to the actual keys within the device, an attacker can use statistical techniques, such as a DPA attack, to effectively amplify the information and breach the security of the cryptosystem.

Recently, it has been shown that Differential Power Analysis (DPA), which relies on side-channel information, can be utilized by attackers to gain information about secret keys. FIG. 2 is a simple lumped component model that is useful for understanding power dissipation measurements. However, one skilled in the art will understand that many other secure systems could be monitored in a similar manner as that shown in FIG. 2 for monitoring a smart card.

One way that power dissipated by a smartcard can be monitored at the ground pin of the smartcard is by using a small resistor ($R_1$) in series between the $V_{ss}$ pin on the card and the true ground. Current moving through $R_1$ creates a time varying voltage that can be sampled, perhaps by a digital oscilloscope. In a CMOS circuit, most power is dissipated when the circuit is clocked. This is known as dynamic power dissipation. Information useful to an attacker is leaked because the amount of current being drawn when the circuit is clocked is directly related to the change of state of $C_{LOAD}$ or the resulting current drawn by the other gates attached to $C_{LOAD}$. On a microprocessor, each clock pulse causes many bit transitions to occur simultaneously. These changes can be observed via the digital oscilloscope.

In a conventional implementation of a cryptographic algorithm, the leaked information is correlated to the secret data, thus enabling an attack. For example, Messerges et al, in "Investigations of Power Analysis on Smartcards", Proceedings of USENIX Workshop on Smartcard Technology, May 1999, pp. 151-161, used actual results from monitoring smartcard power signals to further analyze DPA techniques for attacking DES. More recently, Manfred Aigner et al, in "Power Analysis Tutorial", Institute for Applied Information Processing and Communication University of Technology Graz, Austria, have presented a thorough tutorial for a DPA attack, including how to measure power consumption precisely, and then divide them into two or more different sets with the aid of a selection function D. The power traces of each set are averaged and the result is a bias signal. The two bias signals are subtracted from each other. One input to the D function is six bits of the subkey. The attacker does not know these bits, but can use brute force and try all $2^6$ possible values. For each guess, the attacker re-divides the power traces into different sets, re-calculates the averages and generates a different bias signal. If and only if the D function is correct one can see noticeable peaks in the bias signal. Thus, the attacker can use the information and determine the secret key.

Typically, prior to the beginning of the $16^{th}$ round in a given DES encryption operation, the algorithm will transform a plaintext message based on a secret key into a target binary bit $R_2[b]$, with a value of either 1 or 0. The final ciphertext is available after the $16^{th}$ round as shown in FIG. 3(a). The DPA attacker is able to view this target bit $R_2[b]$, based on the above observable ciphertext, by using a selection function D as defined in Manfred Aigner et al. in "Power Analysis Tutorial" mentioned above. As is shown by FIG. 3(b), when selection function $D(c_i, K_s)$ computes $R_2[b]$ with a correct secret key within a given collection of m ciphertexts, those ciphertexts which produce the value of 1 ($R_2[b]=1$) can be grouped into a single set $S_1$, while those which produce the value of 0 ($R_2[b]=0$) can be grouped into another set $S_2$. (For a simplified, more detailed illustration, see FIG. 4(a).) Obviously, as shown in FIG. 3(c), if a different secret key is guessed during these m selection operations, the set $S_1'$ which produces the value of 1 will be different from the set $S_1$, although there will be overlaps. (For a simplified, more detailed illustration, see FIG. 4(b).) In fact, statistically, about half of the $S_1'$, will be identical to those from $S_0$. These characteristics provide the DPA attacker with the opportunity to determine the secret key by a clever but roundabout approach.

Here is how a DPA attack works. During a DES transformation of a plaintext message into a corresponding target cryptographic cipher bit $R_2[b]$, DPA attempts through exhaustive guesses to arrive at the secret cipher's six key bits $K_s$, represented by $0 \leq K_s < 2^6$. In any one attempt, using the same large number of m ciphertexts, the resulting binary values of $R_2[b]$ will, as always, be either 1 or 0; however, the values will be correctly assigned for every ciphertext only if the key has been correctly guessed. The DPA attacker now groups all the ciphertexts which seemingly produce values of 1 ($R_2[b]=1$) into a single set and all the other ciphertexts, which produce an apparent value of 0 ($R_2[b]=0$) into another set. Since each ciphertext $c_1$ in each set has its own corresponding power trace $w_i$, the attacker can now calculate the average of these power traces (i.e., waveforms) from each set and then compute the difference between the two waveform averages. (Another name for such an average is the bias signal.) The difference in these two bias signals is exploited by the attacker as follows.

DPA utilizes the statistical average of these two sets to determine whether the six key bits $K_s$ for a given target bit have been guessed correctly in the attempted key $K_s'$. When the key that has been guessed $K_s'$ is wrong, the waveform averages will be identical because about half of the ciphertexts in each set will be wrong. For example, as shown by FIG. 3(a), if the left hand side is meant to represent the set of $R_2[b]=1$ (i.e., $S_1'$), half of the ciphertexts will still have a power trace of '0' (shown as the bottom half, which come from $S_0$), thus making the set average equal to 0.5. Similarly, the right hand side is meant to represent the set of $R_2[b]=0$ (i.e., $S_0'$), and there, too, half of the ciphertexts will wrongly have the power trace of '1' (which comes from $S_1$) again averaging to 0.5. As a result, the difference between the two averages will be very small (almost '0') and a trace of the difference will be essentially a flat-line. However, if the guessed key $K_s'$ is the correct key $K_s$, then the power consumption trace of the set $R_2[b]=1$ (i.e. the true $S_1$) will be very different from the set of $R_2[b]=0$ (i.e. the true $S_0$). Thus, as shown in FIG. 5(b), the difference will be very big (almost '1') because one set of ciphertexts (i.e., $S_1'=S_1$) would have the average power trace of '1', but the other set (i.e., $S_0'=S_0$) would have the average power trace of '0'. To put it another way, the evidence of having discovered the correct key is a spike in the trace of the difference of the bias signals.

Of course, those skilled in the art will also appreciate that because the low-level instructions often manipulate several bits, a selection function can simultaneously select values of multiple bits rather than of just one bit $R_2[b]$.

In the prior art, certain techniques have been suggested to try to break the correlation between subsequent segment traces and thus foil such attacks. See, for example U.S. Pat. Nos. 6,298,135 and 6,295,606 to Messerges, et al. However, these approaches have certain limitations that are mentioned below.

In U.S. Pat. No. 6,298,135 Messerges discloses using a randomized starting point in the set of target bits. For each different plaintext sample, the corresponding target bits are processed in a different order, and thus it becomes difficult for a DPA attacker to group related target bits from all the plaintexts of interest to perform statistical analyses associated with given target bit positions. However, this approach does not conceal the information leaked by different address bits and cannot prevent a malicious attacker from using this information to reorder the target bit into the correct bit position.

In U.S. Pat. No. 6,295,606 Messerges discloses another technique that uses a random mask to keep the message and key hidden while they are stored in memory and during the processing of the cryptographic algorithm. Since the mask is randomly changed, new S-boxes must be updated accordingly, and this takes time. The disadvantage of this kind of masking operation not only slows down the DES algorithm by a factor of three to five; it also cannot prevent an attacker from gathering a 48-bit partial key from DES round 16 when the results must be unmasked to provide the correct output of the cipher. (DES round 16 is the last round in the DES encryption algorithm and its output is unmasked as the ciphertext output.) Thus, this approach becomes vulnerable to DPA after unmasking. With 48 bits now known at round 16, the remaining six key bits to make 56 can then be exhaustively searched by the attacker.

Therefore, a need exists for a way to prevent leakage attacks so that an attacker cannot gain information about the secret keys used in cryptographic devices. Further, what is needed is a computationally more efficient approach that will prevent an attacker from gaining even partial information that can be used to determine the keys. It should be apparent that if the technique used to foil the attack only adds 25% to the computational resources of the device, that is far superior to a design that adds a 100% or more to the computational resources of a cryptographic device.

SUMMARY OF THE INVENTION

This invention proposes a unique polarized Cryptographic Bus Architecture (CBA) as a countermeasure to attacks based on power trace analysis such as DPA, effectively making power consumption un-correlatable to cipher bit values. This approach also requires that each bit of the Arithmetic Logic Unit (ALU) register use a set of dual rails to update its content. The unique polarized CBA has the following advantages over the techniques of Messerges and others: 1) it is computationally neutral, hence does not need to slow down the DES algorithm due to updating S-boxes to support random masking, 2) it is robust even in the presence of information leaked from different address bits, 3) it can even conceal the 48-bit partial key from Round 16, and 4) it can be made "probe-resistant" because the polarization control is preferably buried deeply in the poly layer and hence camouflaged.

The present invention provides a method and architecture for securing cryptographic algorithms (i.e. RSA (known by the initials of the three discoveres Rivest, Shamir, Adleman), DES, Advanced Encryption Standard (AES) and non-linear algorithms) from attacks based on leaked power information. Specifically, this approach utilizes, on-chip, the bus architecture of a microprocessor which is used to perform cryptographic operations.

"In another aspect the present invention provides a cryptographic bus architecture which includes a random number generator having a plurality of random number outputs at which a multi-bit random number is output; a plurality of bi-directional bus drivers, each bi-directional bus driver having at least one input for receiving at least one of the random number outputs; and a bus coupling at least one of the plurality of bi-directional bus drivers to at least another of the bi-directional bus drivers; wherein bi-directional bus drivers that are coupled to a common line of the bus are controlled by a common selected one of the random number outputs."

"In yet another aspect the present invention provides a method of preventing a breach of security comprising the steps of: sending encrypted bits over a bus and randomly toggling the polarity of the encrypted bits on that bus."

"In still yet another aspect the present invention provides a method of preventing a breach of security comprising sending encrypted bits over a bus having dual rails for each bit transmitted in a parallel manner on the bus, one rail of the dual rails being inverted polarity-wise compared to the other rail of the dual rails."

"In yet another aspect the present invention provides a method for protecting secret keys. The method includes providing a plurality of bi-directional bus drivers and coupling a line of a data bus between at least a first bi-directional bus driver of the plurality of bi-directional bus drivers and a second bi-directional bus driver of the plurality of bi-directional bus drivers. The method further includes signaling the first bi-directional bus driver to provide a first set of bits, having a first polarity, to the bus and signaling the second bi-directional bus driver to receive the first set of bits having the first polarity; randomly signaling the first bi-directional bus driver to provide a second set of bits to the bus, the second set of bits having an opposite polarity than the first set of bits; and signaling the second bi-directional bus driver to receive the second set of bits having the aforementioned opposite polarity."

"In another aspect the present invention provides a method for preventing information leakage attacks comprising the steps of: randomly inverting a polarity of at least one of a plurality of signals on a first end of a bus; and signaling to a second end of the bus that the random inverting has occurred at the first end of the bus.

"In still yet another aspect the present invention provides a cryptographic bus architecture comprising: a random number generator for generating a multi-bit random number; first and second pluralities of bi-directional bus drivers, each bi-directional bus driver having a control input responsive to a selected bit of the random number; and a bus coupling the first plurality of bi-directional bus drivers to the second plurality of bi-directional bus drivers, each of the bi-directional bus drivers being associated with a single line of the bus and wherein the bi-directional bus drivers coupled to a common line of the bus are responsive to a common bit of random number."

BRIEF DESCRIPTION OF THE DRAWINGS

FIG. 4(a) illustrates, in a simplified fashion, the selection function $D(c_i, K_s)$ computing $R_2[b]$ based on ciphertexts $C_i$ and a correct secret key $K_s$;

FIG. 4(b) illustrates, in a simplified fashion, the selection function $D(c_i, K_s)$ computing $R_2[b]$ based on ciphertexts $C_i$ and an incorrectly guessed secret key $K_s'$;

DETAILED DESCRIPTION OF THE PREFERRED EMBODIMENTS

The present invention now will be described more fully hereinafter with reference to the accompanying drawings, in which preferred embodiments of the invention are shown. This invention may be embodied in many different forms and should not be construed as limited to the embodiments set forth herein.

Statistical correlation between side channel information and a secret key makes current cryptographic systems vulnerable to attack. Side channel information may include information regarding the state of target data bits that have been leaked to the outside through the power consumed by the driver on the internal data bus. The internal data bus usually has relatively large capacitive loading and consumes a significant percentage of the total power of the device. The transistor switching functions to utilize either a "1" or a "0" in the target bit on the data bus driver will result in different power signatures. The power information from a single target bit is amplified by the summing of hundreds or thousands of power traces occurring at similar places in the calculations. Thus, the power trace is correlatable with the target bit on the data bus driver. The correlation can then be used to determine the secret key.

The present invention prevents usage of side channel information by DPA attackers by randomly toggling the polarity of the target bit at the data bus driver while maintaining the equal probability of having a '0' or '1' values. In other words, the power traces no longer statistically correlate with the secret key. Thus, side channel information cannot be used to determine the keys being used by the cryptographic system.

Specifically, with reference to DPA, the result is that within each group of messages having the same target bit values computed from the selection function with correctly guessed key $K_s$, the corresponding power traces will not be always '0' or '1'. The chance of having a '0' or '1' at the target bit will be approximately at 0.5 due to the randomization of polarity. Thus, the selection function D is effectively un-correlatable to the actual power trace measurement. The selection function D has thus been deprived of a way of predicting the power consumption of the actual target bit. In the case of $K_s$ being incorrectly guessed, randomization will maintain the un-correlation between D and the corresponding power traces.

Figure 6:
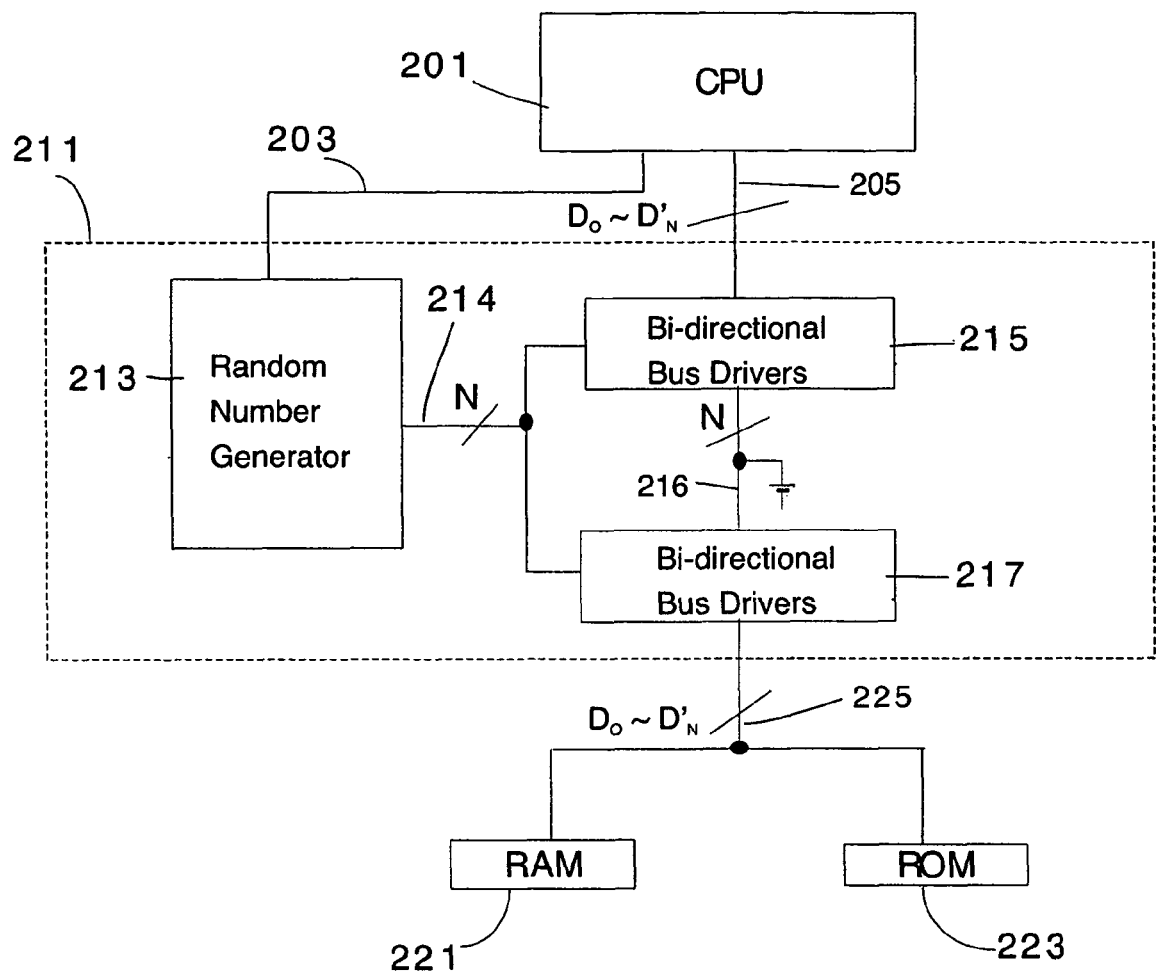
FIG. 6 is a block diagram of a system in accordance with the present invention.

FIG. 6 depicts a Cryptographic Bus Architecture 211 (CBA) in accordance with the present invention, preferably having bi-directional drivers 215, 217 at both ends and a typically heavily loaded bus 216 in between. Bi-directional drivers are preferred since the use of non-bi-directional drivers would tend to increase the number of bus drivers needed to practice the invention. The bus 211 connects CPU 201 to its memories 221, 223. The CPU 201 runs the program stored in the ROM 221 and the RAM 223 is for intermediate storage of the cipher text data and the key.

Figure 1:
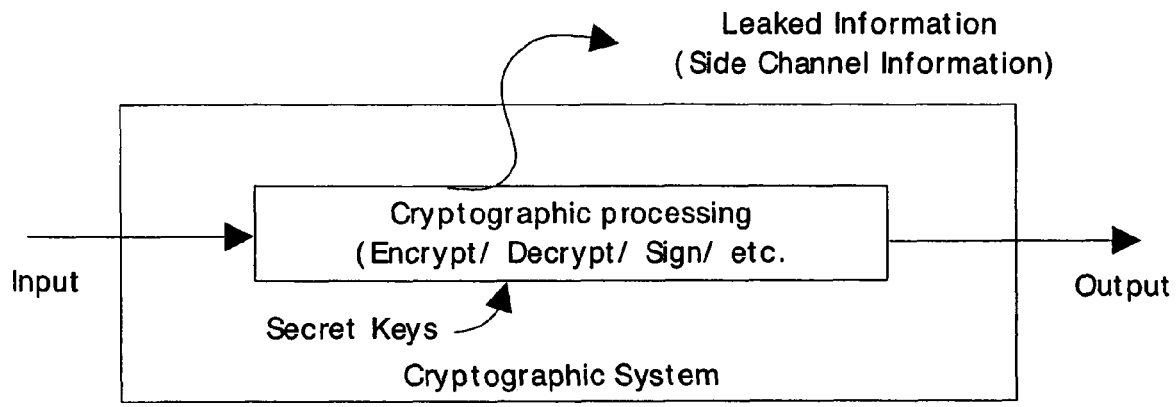
FIG. 1 depicts a prior art diagram of information available to attackers.
Figure 2:
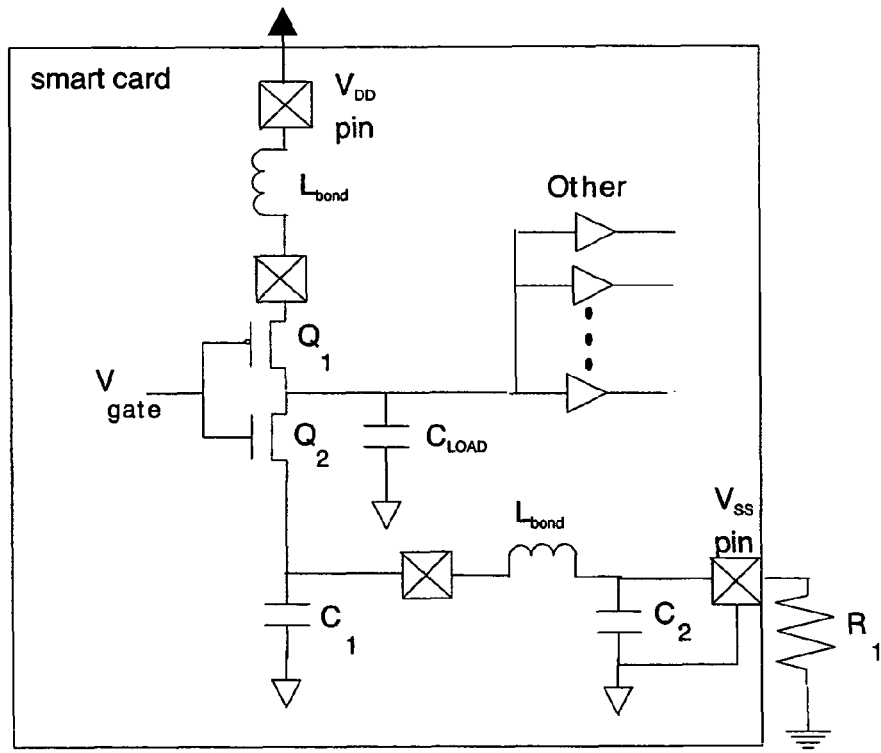
FIG. 2 is a prior art simple lumped component model that is useful for understanding power dissipation measurements.
Figure 3A:
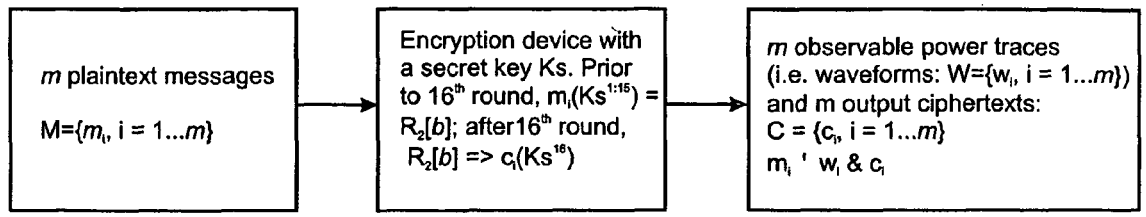
FIG. 3(a) depicts the encryption of m plaintext messages by an encryption device that generates m observable power traces and m output ciphertexts.
Figure 3B:
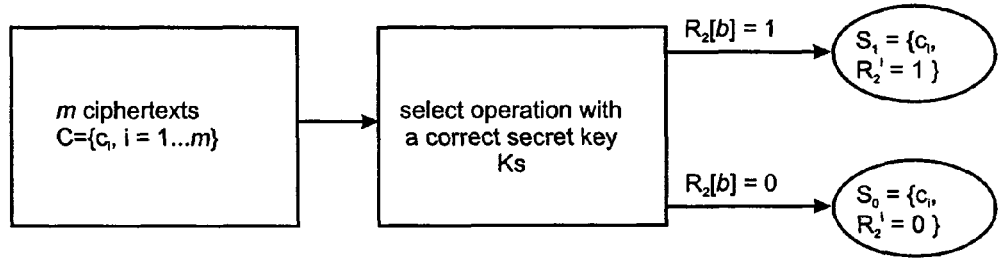
FIG. 3(b) shows the selection function $D(c_i, K_s)$ computing $R_2[b]$ with a correct secret key $K_s$.
Figure 3C:
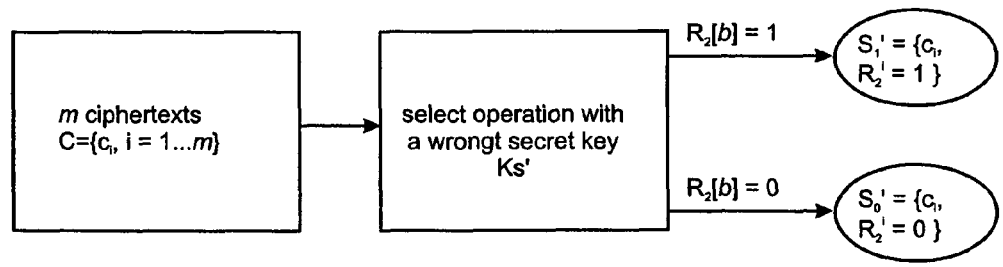
FIG. 3(c) shows the selection function $D(c_i, K_s)$ computing $R_2[b]$ with an incorrect secret key $K_s'$.
Figure 5A:
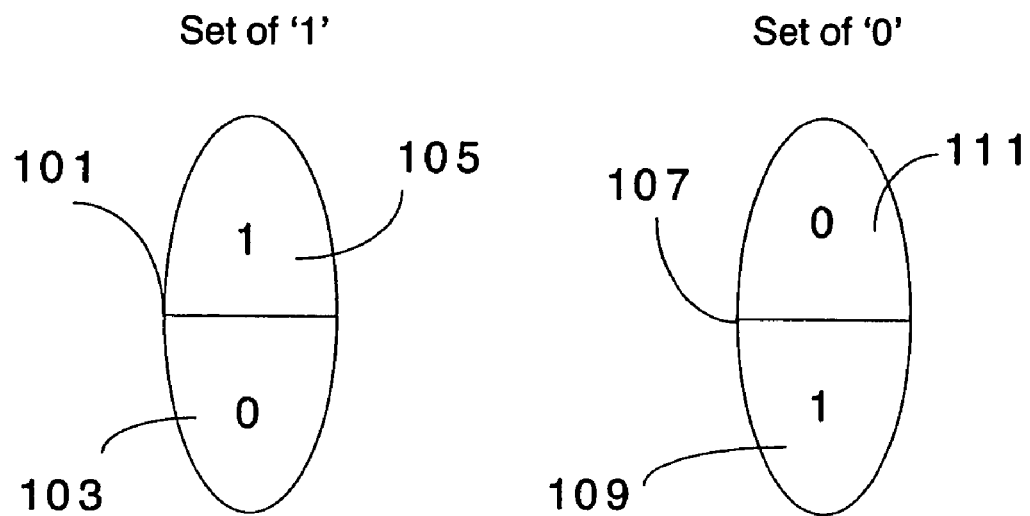
FIG. 5(a) depicts a conceptual representation of prior art probabilities of the resulting power analysis when an incorrectly guessed key $K_s'$ is used.
Figure 5B:
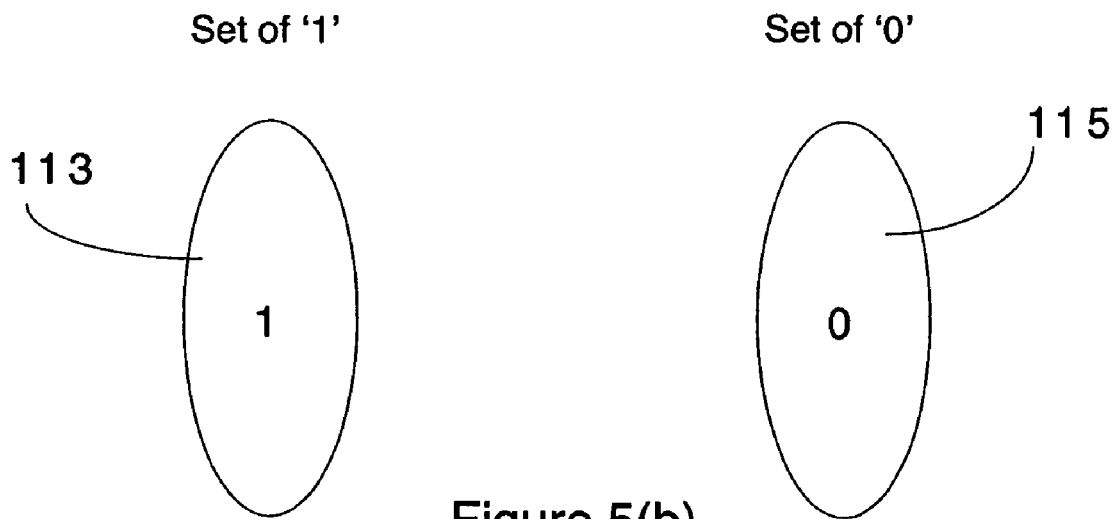
FIG. 5(b) depicts a conceptual representation of prior art probabilities of the resulting power analysis when a correct key $K_s$ is guessed.

The N-bit random number generator 213 controls the N-bit bi-directional drivers 215, 217. The random number generator 213 has N outputs 214, wherein each output comprises of one bit. Each bit $214_0$-$214_N$ controls one bus driver 215, 217, see FIG. 5. A new set of N-bit random numbers $214_0$-$214_N$ is generated by the random number generator 213 whenever an "activate signal" is received from the CPU 201 though the enable line 203. The activate signal is preferably sent by the CPU 201 at the beginning of each DES round and is preferably software invoked. The value of each random bit $214_0$-$214_N$ is used to determine the way to toggle a driver 215, 217, i.e. change its polarity, and drive the heavily loaded internal data bus 216 so as to defeat correlation. The polarity control line or bus 214 is preferably made to be "probe-resistant" because it is preferably buried beneath those circuit features readily visible to the reverse engineer. That is, this control line can be made with implanted layers in the substrate, using the techniques of U.S. Pat. Nos. 5,866,933, 6,294,816 or 6,613,661 (each of which is hereby incorporated herein by reference), and therefore is buried beneath oxide, polysilicon and/or metal, making the possibility of connecting to the control line a much more difficult proposition. The required polarity changes are infrequent enough to thwart the statistical analysis by a reverse engineer. For example, the polarity can be changed at the beginning of each DES round, or at the beginning of fetching each new plaintext for encryption.

Figure 7:
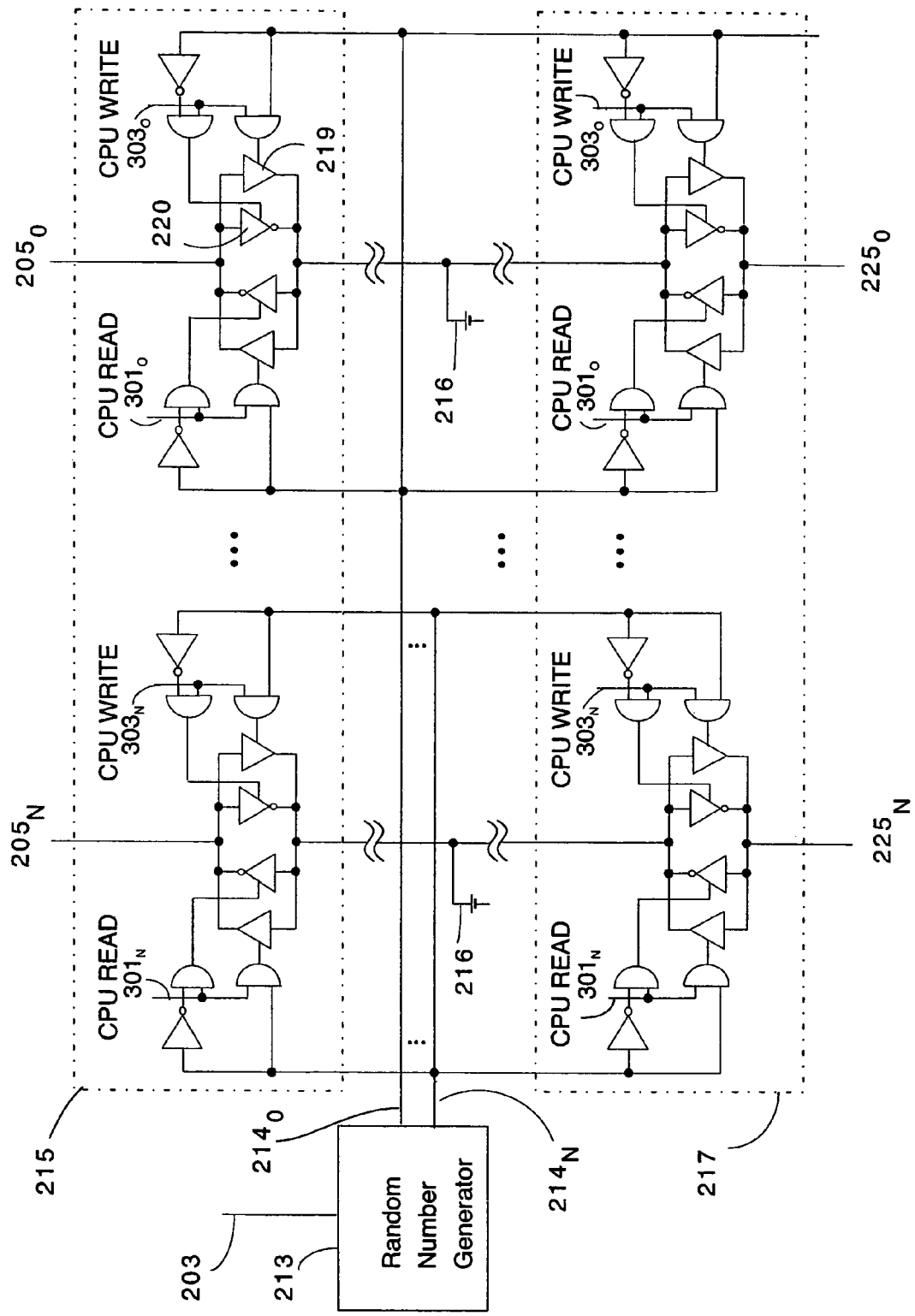
FIG. 7 is a detailed block diagram of a bus architecture in accordance with the present invention.

FIG. 7 depicts a more detailed block diagram of the preferred embodiment. The 'CPU Read' $301_0$-$301_N$ and 'CPU Write' $303_0$-$303_N$ lines are used to control the data flow direction. The bi-directional bus drivers 215, 217 are inverting or non-inverting tri-state buffers determined by the value of the associated random bit $214_0$-$214_N$ if the random number generated by random number generator 213. For example when the random bit $214_0$ is '0' for bi-directional bus driver 215 during a 'CPU write' operation, the signal at $205_0$ will be inverted on the data bus 216. At the other end, bi-directional bus driver 217 will pick up the inverted signal from the data bus 216 for bit $205_0$ and invert the bit again to ensure the integrity of the original data signal. This occurs for each bit of the data signal 205, typically with some bits being inverted and others not. For the case when the bit $214_0$ is a random '1', the non-inverting buffer 219 will drive the data bus 216 instead of the inverting one 220. Since the signals $214_0$-$214_N$ are random, the chance of having a value of '0' or '1' will be approximately 0.5 and 0.5. The result is that all the deterministic power information associated with the content of the data bus will be lost. Thus, even in the case of a DPA attack having a correctly guessed key, the tip-off correlation between the content of the target bit over the data bus and the corresponding power traces is lost.

Figure 8:
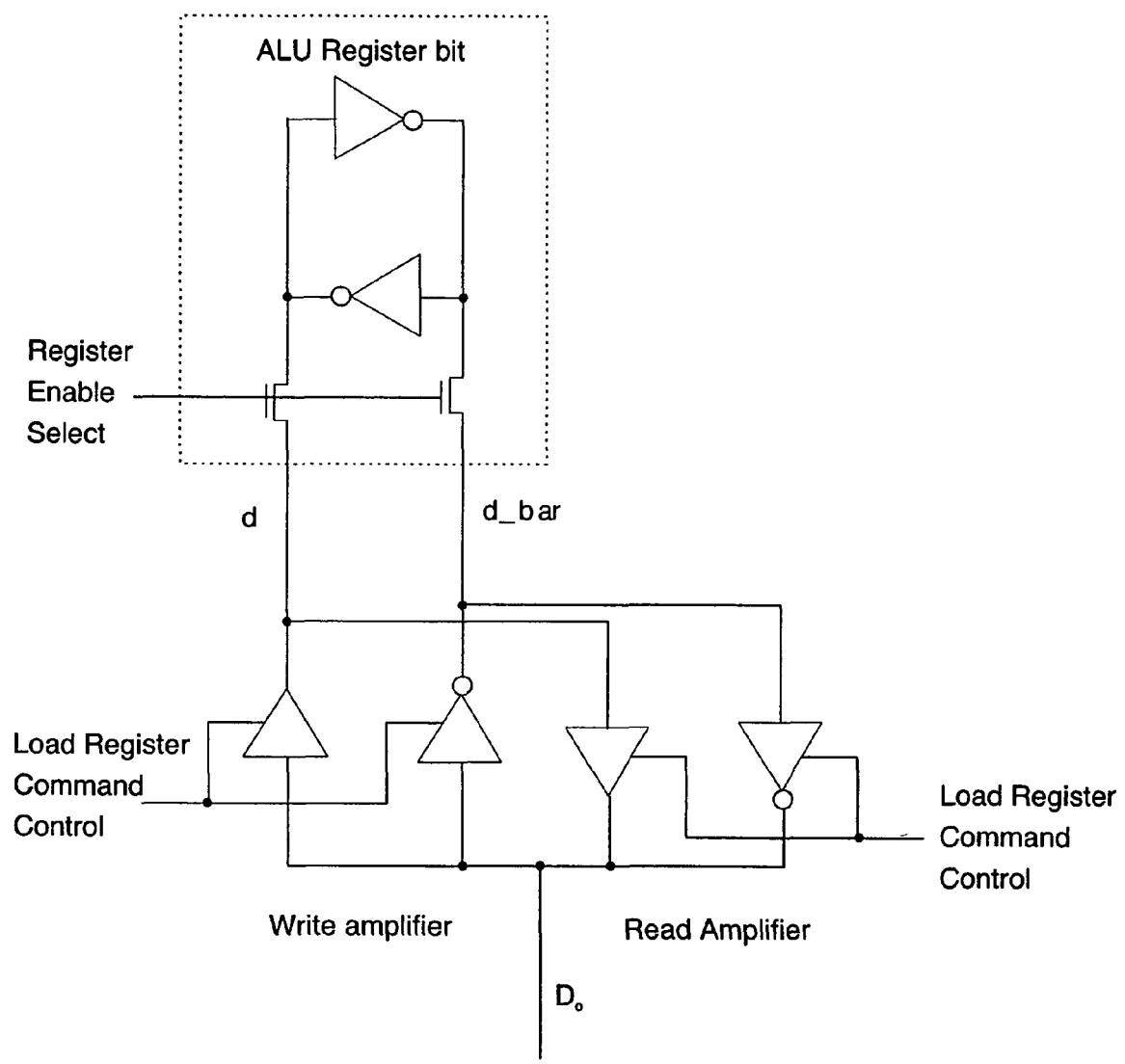
FIG. 8 depicts a block diagram of bit writing with dual rails in accordance with the present invention.

After the logical content of a data bus 216, which tends to have heavy capacitive loading in processor designs, is made un-correlatable to a power trace measurement, any remaining correlation could be coming from the lightly loaded capacitive wires connecting the ALU and register files. To minimize detection of this correlation, a set of dual rails (d and d_bar) is preferably used to write a given register bit as shown in FIG. 8. Because of the symmetry of this design, the dual rails simultaneously contain both the new data 'd' and its complement 'd_bar', thus masking the external power consumption to be normalized at 0.5 as a result of averaging 'd' and 'd_bar'. Note that the presence of complementary read amplifiers and complementary write amplifiers. Specifically, for a data value $D_o$ of '0', the set of dual rails contains '0,1'; for a data value $D_o$ of '1' the data value for the set of dual rails is '1,0'. Therefore, independent of the data value $D_o$, this circuit (including the rails d and d_bar as well as the complementary read and complementary write amplifiers will always have the same average power consumption and thus will make the data value $D_o$ un-correlatable to the power consumption of the circuit. The data value $D_o$ of the circuit of FIG. 8 can have a '0' value or a '1' value, but, in either case, one of d and d_bar will be equal to "0" and the other of d and d_bar will be equal to '1' and their average will, of course, be equal to 0.5. The result is that the power signature of the circuit is independent of the data value content of the ALU register bit. Of course, a given register has multiple bits and each bit of storage is preferably constructed in accordance with the design according to FIG. 8.

In the preferred embodiment, the present invention is implemented in an on-chip bus architecture of a microprocessor that is used to perform cryptographic operations. This architectural approach enables securing existing cryptographic algorithms (including RSA, DES, AES and non-linear algorithms).

From the foregoing description, it will be apparent that the present invention has a number of advantages, some of which have been described herein, and others of which are inherent in the embodiments of the invention described herein. Also, it will be understood that modifications can be made to the method and apparatus described herein without departing from the teachings of the subject matter described herein. As such, the invention is not to be limited to the described embodiments except as required by the appended claims.

What is claimed is:

1. A cryptographic bus architecture comprising:
   a random number generator having a plurality of random number outputs at which a multi-bit random number is output;
   a plurality of bi-directional bus drivers, each bi-directional bus driver having at least one input for receiving at least one of said random number outputs; and
   a bus coupling at least one of said plurality of bi-directional bus drivers to at least another of said bi-directional bus drivers;

wherein bi-directional bus drivers that are coupled to a common line of said bus are controlled by a common selected one of said random number outputs.

2. The cryptographic bus architecture as claimed in claim 1 wherein said plurality of random number outputs is camouflaged.

3. The cryptographic bus architecture as claimed in claim 1 wherein at least one of said plurality of bi-directional bus drivers comprises a normally inverting tri-state buffer and at least another one of said plurality of bi-directional bus drivers comprises a normally non-inverting tri-state buffer.

4. The cryptographic bus architecture as claimed in claim 1 further comprising a set of dual rails coupled to said plurality of bi-directional bus drivers, the set of dual rails coupling said bus to a CPU or to memory.

5. The cryptographic bus architecture as claimed in claim 1 wherein the random number generator is responsive to a control signal for causing said random number generator to emit a new random number.

6. The cryptographic bus architecture as claimed in claim 5 wherein the control signal is generated by a processor.

7. The cryptographic bus architecture as claimed in claim 6 wherein the control signal is generated by said processor in response to a software instruction.

8. A method of preventing a breach of security comprising the steps of: sending encrypted bits over a bus; and randomly toggling the polarity of said encrypted bits on said bus.

9. The method as claimed in claim 8 wherein said bus has dual rails for each bit transmitted in a parallel manner on said bus, one rail of said dual rails being inverted compared to the other rail of said dual rails.

10. The method of preventing a breach of security according to claim 8 wherein the random toggling the polarity of said encrypted bits on said bus occurs less frequently than the sending encrypted bits over the bus.

11. A method of preventing a breach of security comprising sending encrypted bits over a bus having dual rails for each bit transmitted in a parallel manner on said bus, one rail of said dual rails being inverted compared to the other rail of said dual rails.

12. A method of preventing a breach of security according to claim 11 wherein the one of said dual rails which is inverted, compared to the other rail of said dual rails, is randomly changed between said dual rails.

13. A method for protecting secret data comprising:
providing a plurality of bi-directional bus drivers;
coupling a data bus between at least a first bi-directional bus driver of said plurality of bi-directional bus drivers and a second bi-directional bus driver of said plurality of bi-directional bus drivers for transmission of secret data between said first and second bi-directional bus drivers;
signaling said first bi-directional bus driver to provide a set of bits to said bus, each bit of said set of bits having a polarity scheme which associates a voltage level of each bit on the bus with a logical value of the bit, wherein said polarity scheme for each bit of said set of bits is selected by one of a plurality of polarity control lines;
signaling said second bi-directional bus driver to receive said set of bits and a particular polarity scheme selected by said plurality of polarity control lines; and
randomly toggling said plurality of polarity control lines to change how the voltage levels of bits are associated with the logical values.

14. The method as claimed in claim 13 further comprising the step of camouflaging said plurality of polarity control lines of said first and second bi-directional bus drivers.

15. A method for preventing information leakage attacks comprising the steps of:
randomly inverting a polarity of bits of a multi-bit data signal to be transmitted from a first end of a bus to a second end of the bus; and
signaling the second end of said bus that the polarity of bits has been randomly inverted at said first end of said bus so that the multi-bit data signal may be recovered at the second end of the bus.

16. The method for preventing information leakage attacks according to claim 15 wherein the method prevents information leakage from a chip and wherein the step of signaling to a second end of said bus that said inverting the polarity of the randomly selected at least one bit of the multi-bit data signal has occurred at said first end of said bus occurs by transmitting data on at least one polarity control line which is buried beneath circuit surface features of said chip visible to a reverse engineer.

17. The method for preventing information leakage attacks according to claim 15 wherein the multi-bit data signal on the first end of the bus changes more frequently than the random inverting of the polarity of at least one of the bits of the multi-bit data signal at the first end of the bus.

18. A cryptographic bus architecture comprising:
a random number generator for generating a multi-bit random number;
first and second pluralities of bi-directional bus drivers, each bi-directional bus driver having a control input responsive to a selected bit of said random number; and
a bus coupling said first plurality of bi-directional bus drivers to said second plurality of bi-directional bus drivers, each of said bi-directional bus drivers being associated with a single line of said bus and wherein the bi-directional bus drivers coupled to a common line of said bus are responsive to a common bit of said random number.

19. The cryptographic bus architecture as claimed in claim 18 wherein said random number generator has a plurality of camouflaged random number output ports.

20. The cryptographic bus architecture as claimed in claim 18 wherein said bi-directional bus drivers comprise an inverting tri-state buffer or a non-inverting tri-state buffer as determined by a state of data at its control input.

21. The cryptographic bus architecture as claimed in claim 18 further comprising a first and second sets of dual rails coupled to said first and second pluralities of bi-directional bus drivers, the first and second sets of dual rails coupling said bus to a CPU and to memory.

22. A cryptographic bus arrangement comprising:
a random number generator having a plurality of random number outputs at which a multi-bit random number is output; and
a plurality of bi-directional bus drivers, each bi-directional bus driver having logic gates for reading and writing data onto a cryptographic bus and at least one input for receiving at least one bit of said multi-bit random number for either inverting or not inverting a data bit of the data written to or read from the cryptographic bus as a function of the state of said at least one bit of the multi-bit random number.

23. The cryptographic bus arrangement of claim 22 wherein the plurality of bi-directional bus drivers are coupled to a first end of said cryptographic bus and wherein the cryptographic bus arrangement further includes:
a second plurality of bi-directional bus drivers, each bi-directional bus driver of said second plurality having logic gates for reading and writing data at a second end of said cryptographic bus and at least one input for receiving at least one bit of said multi-bit random number for either inverting or not inverting the data written to or read from the cryptographic bus as a function of the state of said at least one bit, and wherein when a particular bi-directional bus driver of the first-mentioned plurality and a particular bi-directional bus driver of the second plurality both communicate with a common conductor of said cryptographic bus, that said particular bi-directional bus driver of the first-mentioned plurality and said particular bi-directional bus driver of the second plurality then have their at least one inputs coupled to a common bit of said multi-bit random number.

24. A method comprising the steps of:

inverting a polarity of randomly selected bits of multi-bit data to be transmitted from a first end of a bus of a chip to a second end of the bus of the chip;

transmitting the multi-bit data with selected bits having inverted polarity;

signaling to the second end of said bus of the chip that said inverting of randomly selected bits has occurred at said first end of said bus of the chip;

receiving the multi-bit data with selected bits having inverted polarity at the second end of the bus; and inverting the polarity of the randomly selected bits of received data at the second end of the bus of the chip so that an original form of the multi-bit data may be recovered at the second end of the bus.

25. A cryptographic bus architecture comprising:

a random number generator having a plurality of random number outputs at which a multi-bit random number is output;

a plurality of bi-directional bus drivers, each bi-directional bus driver having logic gates for reading and writing data onto a cryptographic bus and at least one input for receiving at least one of said random number outputs, wherein the at least one input of each of said plurality of bi-directional bus drivers receives a different bit of the random number output by the random number generator; and a bus coupling at least one of said plurality of bi-directional bus drivers to at least another of said bi-directional bus drivers;

wherein bi-directional bus drivers that are coupled to a common line of said bus are controlled by a common selected one of said random number outputs.

26. A cryptographic bus architecture for communicating data over a bus, the cryptographic bus architecture comprising:

a random number generator having a plurality of random number outputs at which a multi-bit random number is output;

a plurality of bi-directional bus drivers, each bi-directional bus driver having at least one input for receiving one of said random number outputs and having at least another input for receiving a bit of said data, each bi-directional bus driver communicating said bit of said data according to with polarity dictated by said one of said random number outputs; and a bus coupling at least one of said plurality of bi-directional bus drivers to at least another of said bi-directional bus drivers;

wherein bi-directional bus drivers that are coupled to a common line of said bus are controlled by a common selected one of said random number outputs.

27. The cryptographic bus architecture of claim 26 wherein the random number generator comprises a single random number generator at which said multi-bit random number is output, said multi-bit random number being communicated from said single random number generator to said bi-directional bus drivers disposed at both ends of said bus.

28. The cryptographic bus architecture of claim 27 wherein the random number generator comprises a single random number generator at which said multi-bit random number is output, said multi-bit random number being communicated from said single random number generator to said bi-directional bus drivers disposed at both ends of said bus.

29. A cryptographic bus architecture comprising:

a random number generator for generating a multi-bit random number;

first and second pluralities of bi-directional bus drivers, each bi-directional bus driver having a binary control input responsive to a selected bit of said random number, said binary control input controlling the bi-directional bus driver to act as either an inverting or non-inverting bi-directional bus driver as a function of the binary state of said selected bit of said random number; and a bus coupling said first plurality of bi-directional bus drivers to said second plurality of bi-directional bus drivers, each of said bi-directional bus drivers being associated with one line of said bus and wherein the bi-directional bus drivers coupled to a common line of said bus have their binary control inputs coupled to a common selected bit of said random number.

30. A method of communicating data comprising the steps of:

communicating bits representing data over a bus;

toggling the polarity of said bits representing said data when applied to said bus by a bus driver coupled to said bus where the data is applied thereto, the toggling where the data on said bus is applied following a polarity scheme dictated by a random number which changes from time to time; and toggling the polarity of said bits representing said data on said bus by a bus driver coupled to said bus where the data on said bus is received, the toggling where the data is received following said polarity scheme dictated by said random number.

31. The method of claim 30 wherein the random number is generated by a single random number generator having outputs which are each coupled to (i) the bus driver coupled to said bus where the data is applied thereto and (ii) the bus driver coupled to said bus where the data is received so that said polarity scheme is (i) imposed by the bus driver coupled to said bus where the data is applied thereto and (ii) decoded by the bus driver coupled to said bus where the data is received.

* * * * *